(12) United States Patent
Babcock

(10) Patent No.: X7916
(45) Date of Patent: Dec. 31, 1833

(54) PIANO FORTE,CONSTRUCTION & ACTION OF

(76) Inventor: Alpheus Babcock

Alpheus Babcock
Letters Patent

The schedule referred to in these Letters Patent, and making part of the same, containing a description in the words of the said Alpheus Babcock himself, of his improvement in the art of stringing piano-fortes which he denominates "Cross Stringing".

---

My invention and improvement consists in having the two strings of each note formed of the same unbroken wire, - which is secured at each end on the tuning pin-block in the ordinary way passes over the sounding-board bridge, on which the two strings which it forms are kept asunder by a small pin - and is then twisted once or more, or the two strings are made to cross each other, so as in either case to form a loop or eye: - this loop or eye is then made to double round, or hook upon a pin on the pin-block, or on the metallic plate which in some pianos advances from the pin block Towards the sounding board bridge, - or otherwise the loop or eye is passed over and fixed on a hook made in the end of a rod or stout heavy wire of metal, which is fastened at the other end into the pin block, or into the metallic plate (above spoken of) and projects to within a short distance of the sounding-board bridge, - so that the strings have the same line of direction from the pin-block to the tuning pins.
(Note. By inserting two pins, instead of one, on the bridge, the strings may be arranged without crossing or twisting them; but in such case, the strings must change their line of direction at the bridge, and a lateral strain is of course produced, unfavorable to the durability of the instrument.) ..
The mode of stringing, described in this Specification, is applicable to all instruments of two or four strings, whether made with metallic or wooden frames. The modification of it which I prefer, is that which includes the use of the metallic rod between the string and the pin block. The advantages gained by this arrangement are the following.

1. The strings are less liable to get out of tune; - in as much as the part of them beyond the bridge, is by this mode of stringing, greatly shortened. For the same reason, the strings are more easily tuned: the friction of the string on the bridge in the process of tuning an ordinary piano, operating always to prevent an equal degree of tension on the two sides of the bridge; and in fact often causing the bridge of the sounding board to support much of the strain, which should properly be borne by the pin-block only. 2. The sounding board bridge is relieved from the lateral strain, which in the common piano is occasioned by the strings changing their line of direction, after crossing it; as well as from the strain alluded to in the foregoing paragraph: thus increasing the durability of the instrument — —

3. The false tones, to which all ordinary pianos are more or less subject, produced by the vibration of the strings between the bridge of the sounding board and the pin block, are obviously prevented by this improvement - and the tone of the vibrating part of the string is left clear and brilliant -

Witnesses

John P. Wilson
Geo. R. Rae

Alpheus Babcock

Exd.
[illegible]

United States Patent
Patent No.: X7916
A. Babcock,
Piano Frame,
Patented Dec. 17, 1825.
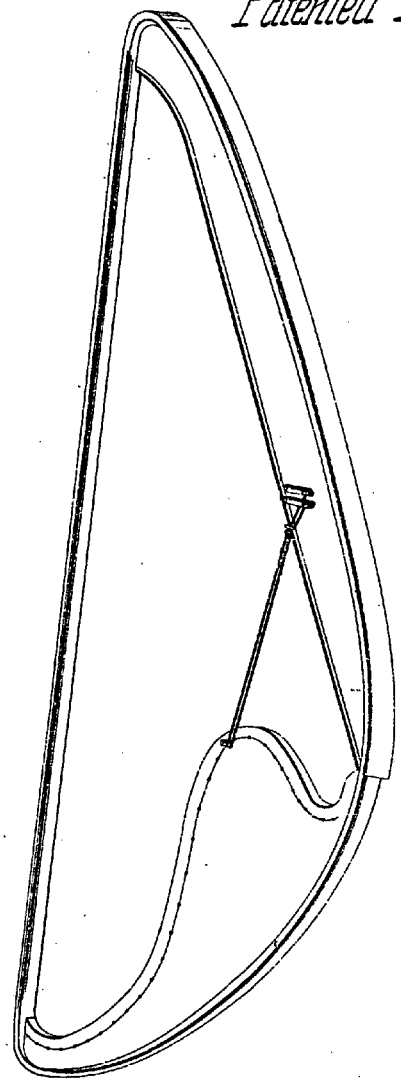
AM. PHOTO-LITHO. CO. N.Y. (OSBORNE'S PROCESS)